United States Patent [19]

Topholm

[11] Patent Number: 4,800,636

[45] Date of Patent: Jan. 31, 1989

[54] PROCESS FOR MANUFACTURING AN IN-THE-EAR CANAL HEARING AID

[75] Inventor: Jan Topholm, Vaerlase, Denmark

[73] Assignee: Topholm & Westermann ApS, Vaerloese, Denmark

[21] Appl. No.: 932,768

[22] Filed: Nov. 19, 1986

[30] Foreign Application Priority Data

Dec. 3, 1985 [DE] Fed. Rep. of Germany ....... 3542616

Feb. 14, 1986 [DE] Fed. Rep. of Germany ....... 3604648

[51] Int. Cl.⁴ .............................................. B29D 17/00

[52] U.S. Cl. .................................... 29/169.5; 29/458; 29/460; 181/129; 264/222; 381/68.6; 381/69; 381/69.2

[58] Field of Search ...................... 29/458, 460, 169.5; 181/135, 129; 264/222; 379/52; 381/68.6, 69, 69.2

[56] References Cited

U.S. PATENT DOCUMENTS

| | | | |
|---|---|---|---|
| 2,945,715 | 7/1960 | Burrell | 29/451 UX |
| 3,170,046 | 2/1965 | Leale | 381/69.2 X |
| 3,345,737 | 10/1967 | Gordon | 29/169.6 |
| 3,440,314 | 4/1969 | Frisch | 264/222 |
| 3,475,528 | 10/1969 | Parks et al. | 264/222 |
| 3,783,201 | 1/1974 | Weiss et al. | 381/69 X |
| 4,617,429 | 10/1986 | Bellafiore | 264/222 X |

*Primary Examiner*—Charlie T. Moon

*Attorney, Agent, or Firm*—Sughrue, Mion, Zinn, Macpeak & Seas

[57] ABSTRACT

The invention relates to a process for manufacturing an in-the-ear-canal hearing aid with microphone, amplifier, volume control, battery compartment with battery, and earphone, together with an individually matched ear-piece by making an impression of the ear canal for producing a casting mold and filling the casting mold with a polymerizable plastic.

The new process involves pulling at least one prefabricated plastic hollow body, matched to the dimensions of the earphone and the other components, into the casting mold, filling the cavity between the hollow body and casting mold with polymeriable plastic, polymerizing the plastic and completing the hearing aid by inserting the earphone and the other components into the completed ear-piece, including securing a cover plate to the ear-piece, after stripping and removal of all parts not required.

15 Claims, 5 Drawing Sheets

Fig. 1
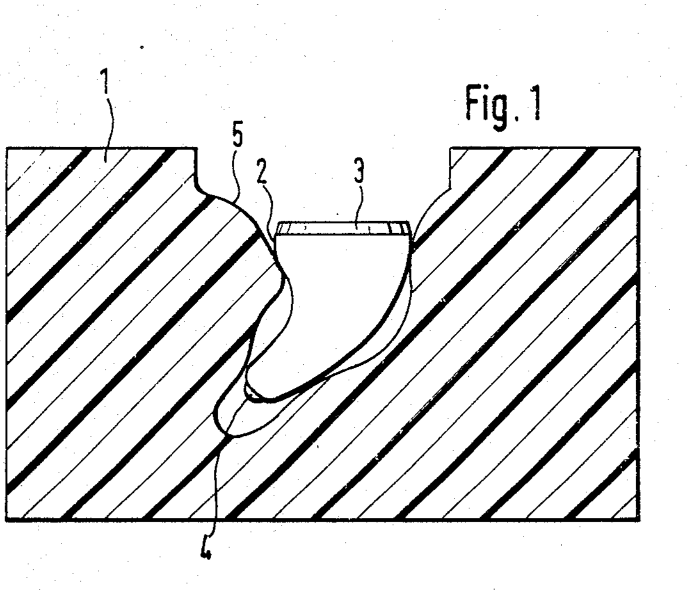
Fig. 2
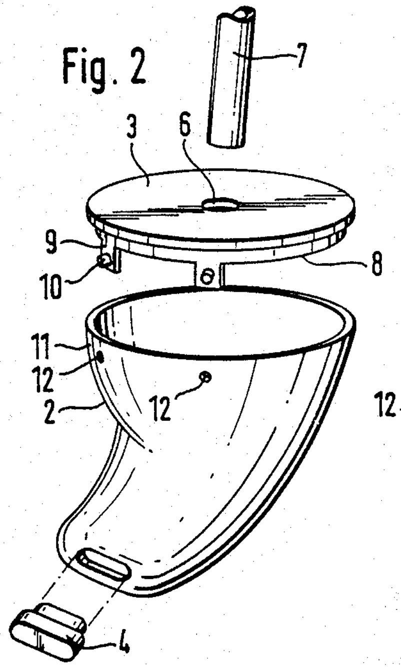
Fig. 3
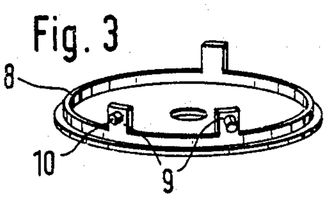
Fig. 3b
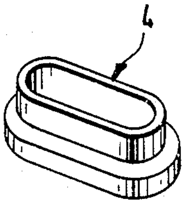
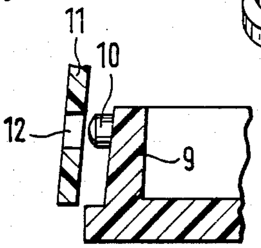
Fig. 3a
Fig. 3c
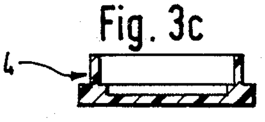

Fig. 4
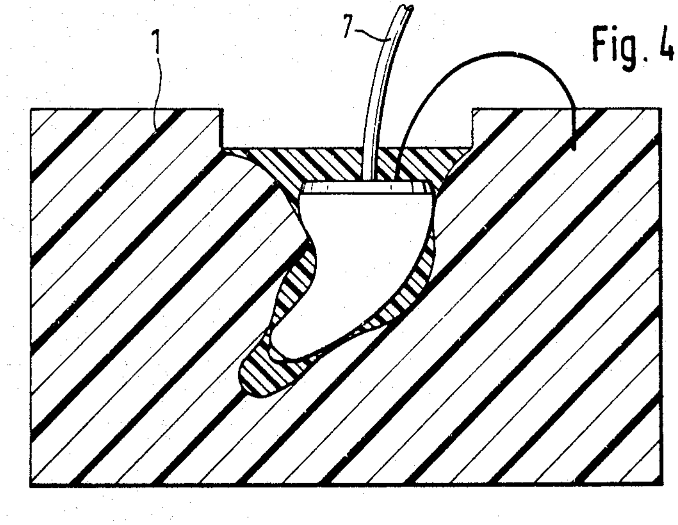
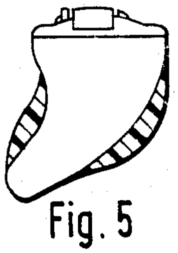
Fig. 5
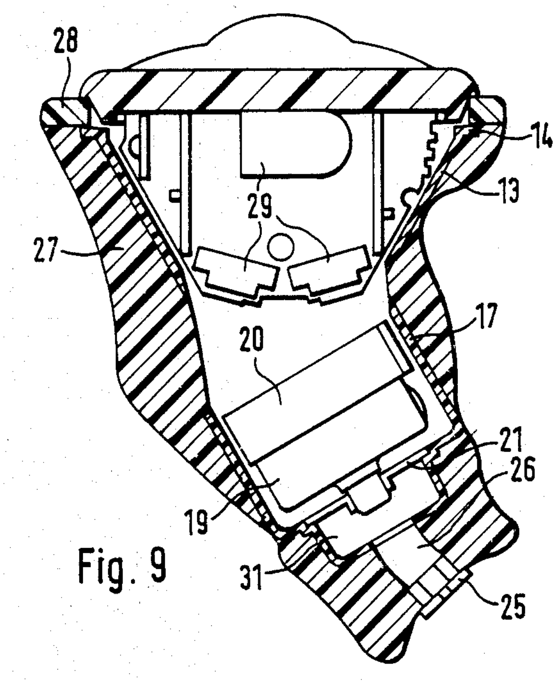
Fig. 9

PROCESS FOR MANUFACTURING AN IN-THE-EAR CANAL HEARING AID

The invention relates to a process for manufacturing an in-the-ear-canal hearing aid with microphone, amplifier, volume control, battery compartment with battery and ear-phone, in addition to an individually matched ear-piece by making an impression of the ear canal for producing a casting mold and filling the casting mold with a polymerizable plastic.

With this method, the procedure to date has been that the plastic was poured into the casting mold and the casting mold was then turned upside down as soon as polymerization has started so that any material not adhering to the casting mold drained out. After polymerization, one thus obtained an ear-piece which precisely fitted the ear from which the impression was made. The exposed upper section of this ear-piece is stripped, e.g. by grinding or other methods, until one obtains a size which is just able to accommodate the various parts of the hearing aid, i.e. a cover plate with batter, microphone, volume control and an earphone connected to the volume control via leads, in addition to the various securing elements for the earphone. All these parts are now accommodated in the ear-piece, arranged as well as can be and then firmly bonded into position.

This method has a whole number of obvious disadvantages.

1. It is extremely difficult to produce an ear-piece with constant, uniformly thin side walls, in particular in the lower end section and thus make optimum use of the space available in the ear.

2. Since all ear-pieces (and ears) are different, securing the individual components and, in particular, accommodating the earphone poses great difficulties and, as regards its position, is left purely to chance and is also very time-consuming.

3. Grinding off or stripping the parts of the ear-piece not required is difficult and takes great experience.

The invention thus proposes a completely new process with which these disadvantages can certainly be avoided. This is achieved in accordance with the invention in the way indicated in the patent claims.

Figure 6:
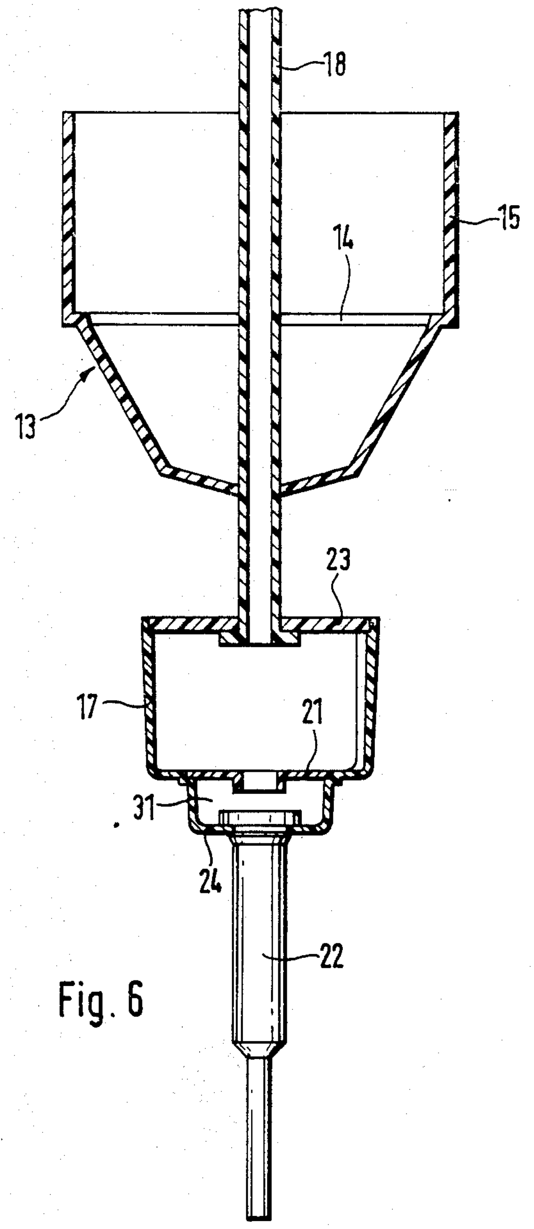
Figure 7:
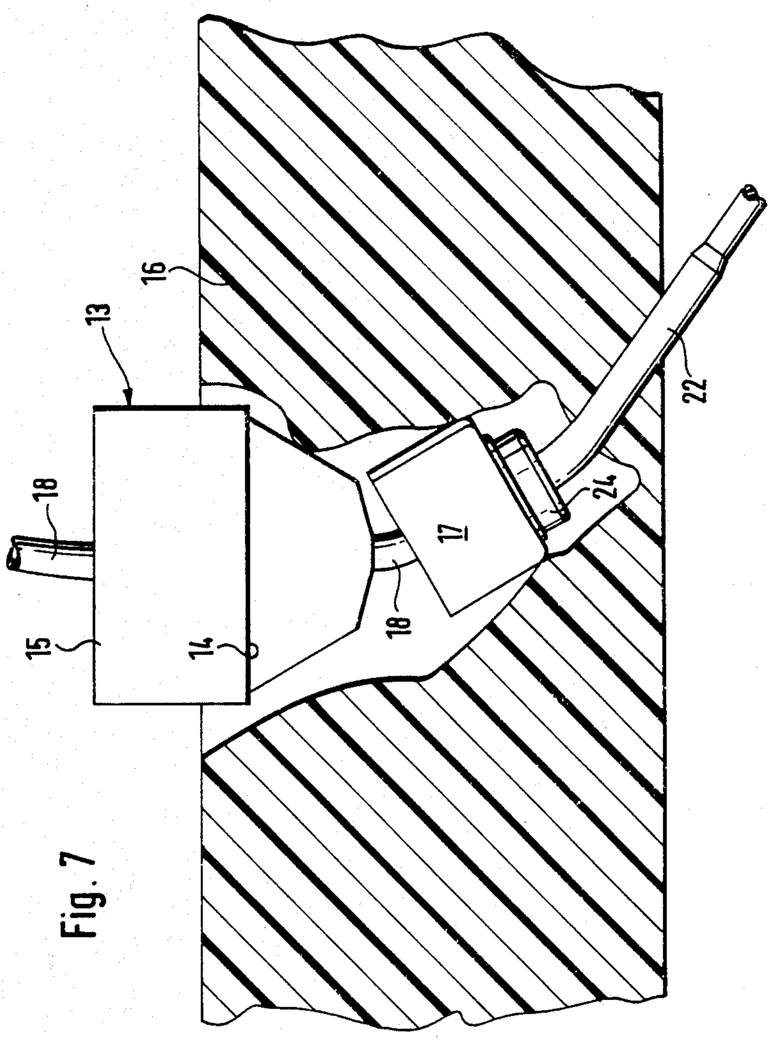
Figure 8:
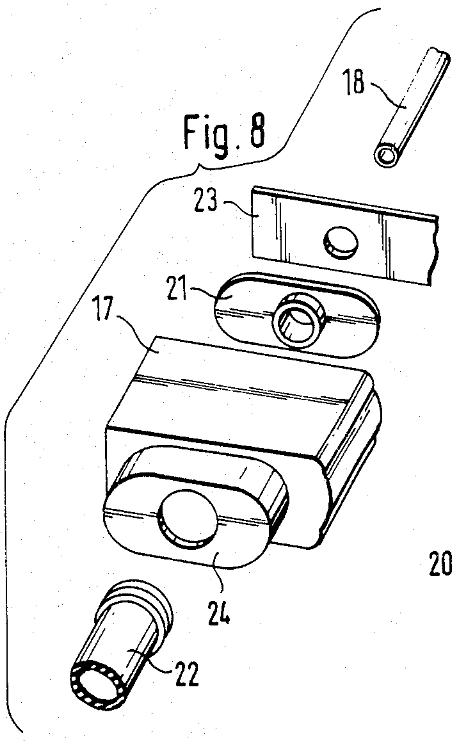
Figure 10:
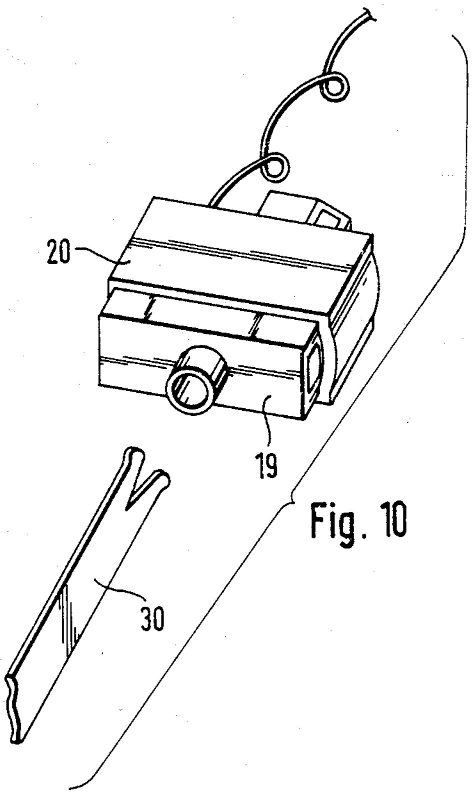

The invention will now be explained in more detail, taking various embodiments in conjunction with the enclosed figures. The figures show:

FIG. 1 a sectional view of the casting mold with fitted collar;

FIG. 2 the collar with a temporary cover plate and a plug;

FIGS. 3–3*c* the temporary cover plate for the collar, its securing facility and the plug, both in perspective and a sectional view thereof;

FIG. 4 a completely filled casting mold;

FIG. 5 a schematic diagram of the completed hearing aid in the ear-piece;

FIG. 6 a further embodiment of the invention with an upper component chamber with remote, broad collar, an earphone chamber, a small connecting tube and a small rubber rod;

FIG. 7 a casting mold with component chamber and earphone chamber pulled in;

FIG. 8 an earphone chamber;

FIG. 9 a finished hearing aid;

FIG. 10 an earphone with holder.

The process, in accordance with the invention, for manufacturing an in-the-ear-canal hearing aid in accordance with an initial embodiment of the invention can best be explained with FIGS. 1 and 4. A collar, the inner dimensions of which are precisely matched to the components to be accommodated in the ear-piece of an in-the-ear-canal hearing aid, is inserted as deeply as possible into a casting mold 1, preferably produced in the conventional way, in such a way that the side walls of the collar contact the side walls 5 of the casting mold over as large an area as possible. This collar is then sealed at its upper side by means of a temporary cover plate 3, the details of which will be explained below on the basis of FIGS. 2 and 3. In the same way, the collar 2 is sealed at its lower end by a temporary plug 4. Using this prefabricated collar means that the space available for accommodating the components is clearly predetermined. Naturally, variously sized collars will need to be used for correspondingly different dimensions of ear canals.

The cover plate shown in FIG. 2 has a projecting edge 8 at which a few, for example 3 or 4, lugs 9 project and pins 10 which project towards the outside are attached to these lugs. As can be seen in detail in FIG. 2*a*, the side wall 11 of the collar has continuous bores 12 at its upper edge and these bores serve to accommodate the pins 10 snugly and fully. In addition, the temporary cover plate has a bore 6 through which a small tube 7 is inserted. This tube serves to relieve the pressure on the collar during the casting process in order to prevent the collar collapsing as the result of the partial vacuum.

In turn, casting is carried out in the conventional way by filling the mold with casting resin to a level far above the surface of the temporary cover plate. When the casting resin has set, the resultant blank is removed from the mold.

The sections which are not needed must now be removed by grinding and cutting. In order to recognize where the actual ear-piece starts, the cover plate and the plug will be made of a material which is dyed a color which contrasts with the color of the casting resin. The material which does not constitute a part of the actual ear-piece can then be removed with painstaking care.

However, it is particularly advantageous if the temporary cover plate and the plug are made of a material which is dyed, preferably also a contrasting color, which does not combine with the synthetic resin used for the ear-piece. This means that the temporary cover plate can be removed easily after completion and setting of the casting and removing all parts of the plug not required.

This new process can also be further improved by initially pouring a small quantity of casting resin into the casting mold when casting and then pressing the collar, sealed at the top and bottom, as deep as possible into the casting mold and the casting resin which it contains, whereby, in turn, it must be ensured that the side walls of the collar contact the side walls of the casting mold over as large an area as possible. This guarantees that the collar which is pressed in as deeply as possible is retained better in the casting mold.

FIGS. 3*b* and 3*c* show one possible embodiment of such a plug. This plug has precisely the shape and size of the cerumen collector which is fitted at a later point, the only difference being that the plug is sealed at the bottom. After the hearing aid is completed by inserting all components including the correct cover plate, the cerumen collector which is not illustrated is inserted in place of the plug.

One further equivalent method for this process is to use a solid part which precisely fits the collar in place of the temporary cover plate and, if applicable, also in place of the temporary plug. The upper end of this solid part must be shaped approximately in the same way as a cover plate and, if applicable, its lower end must be able to replace the plug. On the other hand, the solid part could also be used together with a plug which can be inserted from the outside into the collar.

This solid part would mean that there is no need for the bore 6 and the small tube 7 since the solid part would be capable of absorbing the pressures occurring during casting. Likewise, the solid part would also be provided with pins 10 at its upper edge which could engage in the bores 12 on the side wall 11 of the collar.

This involves no basic modifications to the overall process.

The new process also affords particular advantages if the impression of the ear is made by applying slight pressure to the tragus of the patient as early as when applying the mass reequired for producing the impression in the ear canal, when producing the casting mold. When an ear-piece is cast with a casting mold produced in this way, the resultant ear-piece will also exert slight pressure on the tragus when fitted in the ear canal and thus reliably prevent unintentional and undesirable loosening of the snugly fitting hearing aid in the ear canal.

It can thus be seen that this new casting method can be used in particular for a more or less standardized shape and size of ear-pieces. If, in addition, the material used for the collar is selected such that it combines with the casting resin, this will always achieve a uniform ear-piece wall thickness corresponding to the thickness of the outer wall of the collar.

FIGS. 6 to 10 show one further embodiment of the invention.

In FIG. 6, we can see a component chamber 13 with an upper horizontal edge 14 joined by an extended sleeve 15. This component chamber is made of a plastic which is compatible with the polymerizable plastic used for the ear-piece and which combines with it. We can also see an earphone chamber 17 with resonance chamber 31 and a cover plate 23 through which a small connecting tube 18 passes. This tube, in turn, is routed through a hole in the base of the component chamber 13. Finally, we can see a small rubber rod 22 with which the chambers are pulled into the mold.

FIG. 7 shows a sectional view of a casting mold 16 produced in accordance with the individual impression of the patient's ear canal. The component chamber 13 and an earphone chamber 17 which are both interconnected by a small flexible tube or flexible pipe which passes through bores at the base of the two chambers, are fitted into this casting mold.

When preparing the casting process, the small rubber rod 22 is pulled through a bore at the lowest part of the mold 16, thus pulling the two chambers 13 and 17 into the mold. It is then attempted to pull these two chambers as deep as possible into the mold. They should and can certainly contact the side walls of the casting mold. The polymerizable plastic is then poured into the mold up to a level above the horizontal edge 14 of the component chamber 13. The plastic material is then polymerized, under pressure if necessary. The small tube 18 serves to equalize the pressure since the earphone chambers would otherwise collapse under the pressure.

The ear-piece is then removed from the mold and either ground or cut off to the level of the horizontal edge 14. The small tube and small rod are then pulled out. Finally, the material which separates the two chambers in the mold is removed by grinding.

FIG. 8 shows the earphone chamber 17, a suspension device 21 and a cover plate 23. The earphone chamber 17 has a sound outlet connection 24 which may possibly contain a resonance chamber.

FIG. 9 shows the ear-piece 27 with the cover plate 28, shown schematically, and the other components 29 which are also shown schematically, namely the earphone 19 with its holder 20 and 21, the sound outlet opening leading to the ear canal 26 and the cerumen collector 25.

The cover plate 28 which either already bears the other parts or which is to accommodate the amplifier and the related components subsequently, is then fitted onto the ground-off upper dege of the ear-piece which it fits precisely. Alignment marks are provided both in the components chamber and in the cover plate. The cover plate can, for example, be bonded to the ear-piece or secured in another way. The parts which are not necessary are then ground off and the edges are polished.

FIG. 10 shows an earphone 19 with collar 20 and a small assembly rod 30 for the earphone. This small assembly rod is used to pull the earphone 19 into the earphone chamber 17 and the earphone then fits exactly in it.

This affords particular advantages. The chambers 13 and 17, made of plastic, comprise a material, which combines with the material of the ear-piece and which has the same color. This means that 1. the mimimum wall thickness of the ear-piece is equal to the wall thickness of the two chambers 13 and 17 and may be very thin, thus permitting the available space to be utilized optimally;

2. the hearing aid and the actual earphone fit precisely in the resultant ear-piece. This applies to all ear-pieces;

3. this means that it is no longer a question of guesswork as to whether and where adequate space is available for the components.

It also does away with guesswork as to how much of the ear-piece blank needs to be stripped since this is clearly defined by the horizontal edge 14 of the component chamber 13.

In addition, a resonance chamber 31 can be incorporated in the ear-piece in order to improve the frequency response of the hearing aid.

Thus, the invention permits the available space within an ear-piece to be utilized optimally and always in the same way which can be predetermined, with a precisely and snugly fitting arrangement of the earphone and its securing facility in addition to the other components and the cover plate with minimum wall thickness of the ear-piece.

We claim:

1. In a process for manufacturing an in-the-ear canal hearing aid with microphone, amplifier, volume control, battery compartment with battery and earphone, in addition to an individually matched ear-piece, produced by making an impression of the ear canal for producing a casting mold and filling the casting mold with a polymerizable plastic resin, the improvement comprising the following process steps:

inserting at least one prefabricated plastic hollow body, matched to the dimensions of the earphone and the other components, as deeply as possible into the casting mold, until parts thereof touch large surface portions of the side walls of the casting mold; filling the cavities between the hollow body and the casting mold with the polymerizable plastic resin and causing the casting resin to combine with the material of the hollow body, removing the polymerized ear-piece blank, stripping and removing all excess parts of the ear-piece blank by cutting or grinding, and inserting the earphone and the other components in the ear-piece, including securing a cover plate to the ear-piece, whereby the walls of the final molded ear-piece are as thin as possible, permitting the available space within the molded ear-piece molded in hollow body to be utilized optimally while facilitating the precise fitting of the actual earphone in the resultant ear-piece and precise snug fitting of the earphone and its securing facility in addition to the other components and the cover plate to the ear piece.

2. Process in accordance with claim 1, further comprising the steps of:

sealing an opening within the lower end of a hollow body by a removable plug, and an opening within an upper end of said hollow body by a removable temporary cover plate, and removing the plug and the temporary cover plate prior to completing the hearing aid by inserting all components, including the final cover plate, and a cerumen collector in place of the plug.

3. Process in accordance with claim 2, wherein the plug and the temporary cover plate are made of a material which is dyed a color contrasting with that of the hollow body and the casting resin.

4. Process in accordance with claims 2 or 3, characterized by the fact that the temporary covr plate and the plug are made of a material which does not combine with the casting resin.

5. Process in accordance with claim 2, further comprising the step of providing a temporary cover plate with a bore and inserting a small thin tube in the bore for pressure equalization within said hollow body.

6. Process in accordance with claim 1, when filling the casting mold, firstly a small quantity of casting resin is poured into the casting mold, the hollow body then being pressed as deep as possible into the casting mold and into the casting resin and then the remaining casting resin is poured into the casting mold beyond the level of the temporary cover plate.

7. Process in accordance with claim 1, wherein the upper edge of the hollow body has a number of continuous bores and wherein a temporary cover plate is provided having a corresponding number of pins which point outwards on its edge and project downwards, and wherein the process further comprises fitting the pins into the continuous bores to fill them completely when the temporary cover plate is fitted to the hollow body.

8. Process in accordance with claim 1, characterized by the fact that an initial, prefabricated hollow body is used for the earphone and its holder and a second hollow body is used for the other components, that the two hollow bodies are interconnected by means of a connecting piece, that the first hollow body has a lug at its bottom end, that this lug has a bore through which a small rubber rod is inserted and that the hollow bodies are pulled into the casting mold with the aid of this small rubber rod and the connecting piece through a hole in the lower end of the casting mold.

9. Process in accordance with claim 8, characterized by the fact that the connecting piece is configured as a small thin tube, that this small tube is pulled in through bores at the base of the second hollow body and at the base of the first hollow body and that the two hollow bodies are pulled as deeply as possible into the casting mold with the aid of this small rubber rod and the small rubber rod which is inserted through the bore in the lower end section of the casting mold.

10. Process in accordance with claim 8, characterized by the following process steps:

using an initial earphone chamber made of plastic into which the earphone and its suspension facility precisely fit and through the lower end of which a small rubber rod is guided through a bore provided and a second component chamber made of plastic with a collar fitted to a horizontal edge into which the other components of the hearing aid precisely fit, and connecting these to chambers by a small flexible tube which passes through bores at the base of both chambers, making a bore through the base of the casting mold, inserting the small rubber rod into this bore and pulling the two chambers into the casting mold until they preferably at least partially contact the side walls of the casting mold and the horizontal edge of the first component chamber lies within the casting mold, pouring in the polymerizable plastic between the chambers and the casting mold until it reaches a level above the horizontal edge, polymerizing the plastic, removing the ear-piece blank and stripping the blank as far as the horizontal edge and stripping or removing the material which separates the two chambers in the casting mold, in addition to removing the small tube and small rod.

11. Process in accordance with claim 10, characterized by the fact that a plastic which combines with the material used for the ear-piece is used for the chambers.

12. Process in accordance with claim 11, characterized by the fact that a plastic of identical color is used for both materials.

13. Process in accordance with claim 1, wherein a resonance chamber is integrated in the earphone chamber.

14. Process in accordance with claim 1, wherein the cover plate of the earphone chamber has a contrasting color, thus simplifying orientation when cutting through from the component chamber to the earphone chamber.

15. Process in accordance with claim 1, further comprising the process steps of:

securing a tube or a small assembly rod at the sound outlet connector of the earphone fitted in its securing facility and pulling the earphone assembly which precisely fits the earphone chamber into this chamber, fitting the other components, including the final-sized cover plate into or onto the ear-piece and securing the cover plate to the ear-piece.

* * * * *